United States Patent
Van Bemmel et al.

(10) Patent No.: US 12,178,171 B2
(45) Date of Patent: Dec. 31, 2024

(54) SYSTEM AND METHOD FOR CONTROLLING A LIGHT SOURCE ILLUMINATING PLANTS IN A GREENHOUSE

(71) Applicant: Ledgnd B.V., Capelle aan den Ijssel (NL)

(72) Inventors: Maarten Van Bemmel, Den Dolder (NL); Ramón Van de Vrie, Rotterdam (NL)

(73) Assignee: Ledgnd B.V., Capelle aan den Ijssel (NL)

( * ) Notice: Subject to any disclaimer, the term of this patent is extended or adjusted under 35 U.S.C. 154(b) by 0 days.

(21) Appl. No.: 18/236,436

(22) Filed: Aug. 22, 2023

(65) Prior Publication Data

US 2024/0065180 A1 Feb. 29, 2024

(30) Foreign Application Priority Data

Aug. 23, 2022 (EP) .................................... 22191650

(51) Int. Cl.
*A01G 9/24* (2006.01)
*H05B 45/22* (2020.01)

(52) U.S. Cl.
CPC ............ *A01G 9/249* (2019.05); *H05B 45/22* (2020.01)

(58) Field of Classification Search
CPC ................................ A01G 9/429; H05B 45/22
See application file for complete search history.

(56) References Cited

U.S. PATENT DOCUMENTS

| | | | | |
|---|---|---|---|---|
| 6,528,954 | B1* | 3/2003 | Lys | H05B 45/22 315/158 |
| 2003/0025709 | A1* | 2/2003 | Kim | G09G 3/2003 345/589 |
| 2004/0052076 | A1* | 3/2004 | Mueller | F21V 23/0442 362/293 |
| 2007/0034775 | A1* | 2/2007 | Cheng | H05B 45/40 257/E25.032 |
| 2013/0258684 | A1* | 10/2013 | Yang | A01G 9/249 362/386 |
| 2018/0116025 | A1* | 4/2018 | Adams | H05B 47/18 |
| 2019/0320590 | A1* | 10/2019 | Adamson | A01G 7/045 |
| 2020/0236870 | A1* | 7/2020 | Lys | G01N 33/246 |
| 2021/0329850 | A1* | 10/2021 | Adamson | H05B 45/10 |

* cited by examiner

Primary Examiner — Bryon T Gyllstrom
(74) Attorney, Agent, or Firm — The Dobrusin Law Firm, P.C.

(57) ABSTRACT

A system for controlling a light source illuminating plants in a greenhouse, the system includes: a sensor for detecting a first spectrum of ambient light, the sensor being configured to measure incident intensities in at least two wavelength ranges, and a control unit for adjusting a second spectrum of the light source in dependency of the measured intensities in the at least two wavelength ranges; and a method for operating a system for controlling a light source illuminating plants in a greenhouse, the method includes a measuring step where the sensor detects incident intensities in at least two wavelength ranges, and an adjustment step the second spectrum of the light source is adjusted in dependency of the measured intensities in the at least two wavelength ranges.

15 Claims, 2 Drawing Sheets

SYSTEM AND METHOD FOR CONTROLLING A LIGHT SOURCE ILLUMINATING PLANTS IN A GREENHOUSE

CROSS REFERENCE TO RELATED APPLICATIONS

This application claims priority to EP 22191650.5 filed on Aug. 23, 2022, the entirety of which is hereby incorporated by reference herein for all purposes.

FIELD

The present invention relates to a system for controlling a light source illuminating plants in a greenhouse.

BACKGROUND

Traditionally, plants are grown by farmers by way of field cultivation. For this purpose, specific atmospheric conditions are indispensable for successful cultivation. In particular, the soil must be rich in humus and hence provide sufficient amounts of nutrients. Furthermore, the soil as well as the ambient air must provide enough humidity so as to promote plant growth. Moreover, adequate radiation must be ensured. In addition, and importantly, plant cultivation is inextricably linked to a provision of sufficient acreage.

The global population and therefore the demand for sufficient food is increasing incessantly. At the same time— among others due to anthropogenic industrial emissions and other human interferences in the natural planetary systems over the course of globalization—the climate is subject to long-term changes, especially to unfavorable changes from the standpoint of plant cultivation: Heat waves and water scarcity, but also a lack of soil nutrients as a consequence of monocultural farming et cetera are some of the challenging phenomena and examples for the deterioration of cultivation conditions that farmers are currently faced with and most likely will be con-fronted with on a regular basis in the future. According to scientific disclosures the adverse agricultural conditions will subsist and the challenging phenomena will occur even more frequently, when steady, predictable and controllable cultivation conditions are actually required for optimal agricultural outputs.

One approach in solving this problem can be found in the so-called greenhouse technologies. This technology incorporates controlled-environment agriculture in order to optimize plant growth and to increase crop yield and goes along with a smaller cropland. Furthermore, greenhouses can enable a decrease of human interference in the cultivation process due to automatization which increases the overall performance since machines don't need sleep or vacation and are not affected by sentiment fluctuations and thus are much less prone to errors. Automatization is expected to increase over time along with developments in machine learning and artificial intelligence. Also, greenhouses go hand in hand with the benefit of reducing transportation efforts since the cultivation can be carried out in urban territories, such as on rooftops and therefore close to consumers, thereby rendering pollutive and costly shipments superfluous.

However, a current drawback of this technology are limitations in the technical creation of optimal cultivation conditions. More particularly, it is challenging to detect exact ambient environmental conditions within the greenhouse, based upon which optimal adjustment of technical devices can be performed.

SUMMARY

It is an object of the present invention to provide a system addressing the above-mentioned challenge at least partially.

The object of the present invention is achieved by a system for controlling a light source illuminating plants in a greenhouse, wherein the system comprises
- a sensor for detecting a first spectrum of ambient light, the sensor being configured to measure incident intensities in at least two wavelength ranges, and
- a control unit for adjusting a second spectrum of the light source in dependency of the measured intensities in the at least two wavelength ranges.

Colors occurring in nature consist of light comprising different wavelengths. The distribution of the wavelengths is called spectrum. The spectrum in a greenhouse can vary, for instance depending on daytime, season, weather et cetera. Typically, spectra can comprise a so-called dominant wavelength. Such a spectrum comprises a peak at the wavelength/frequency of the dominant wavelength. Total illumination energy of incident light is measured by the integral of the spectrum, the dominant wavelength making a higher contribution to the illumination due to its peak. In a greenhouse, it is of paramount importance to measure the ambient lighting conditions for optimal plant growth conditions. More particularly, it is crucial to detect and know the actual wavelengths within the greenhouse since individual plants need a different composition of wavelengths for their optimal growth. Therefore, measuring the total illumination in lux can be deficient. Based on the measured light conditions/wavelengths, additional plant-specific wavelengths or wavelength compositions (spectra) can be technically created, in order to make up for the, e.g., lack of required wavelengths. Therefore, the system according to the invention comprises a sensor that detects a first spectrum of ambient light within the greenhouse. Preferably, the sensor is a photo diode. It is conceivable to employ a multitude of sensors. Alternatively, the sensor can comprise multiple channels, each channel representing, e.g. and preferably, a photo diode. The sensor is configured to measure intensities in at least two wavelength ranges. The measurement in at least two wavelength ranges rather than one can give a more accurate picture of the actual lighting conditions present in the greenhouse. It is conceivable that the at least two wavelength ranges are narrower than one wider wavelength bandwidth. Furthermore, the sensor can comprise one or many filters. Filters can be deposited onto the sensor, for instance photo diode, in order to change the sensitivity of the sensor and meet application requirements. In case of a plurality of sensors or channels, each filtered sensor or channel can be sensitive to a different wavelength range/band of light. Preferably, the filter type is Gaussian, reproducing or at least approximating a typical bell curve. In other words, the at least two spectral distributions can lack a dominant wavelength. Moreover, the system comprises a control unit for adjusting a second spectrum of the light source in dependency of the measured intensities in the at least two wavelength ranges. In other words, the light source can technically complement natural light and thus advantageously induce optimal plant growth conditions inside the greenhouse. Preferably, the light source is an LED. Also, it is conceivable that the system comprises a plurality of light sources. Overall, the above-mentioned drawback of the state of the art is eliminated at least partially by the inventive system that can contribute technically to the creation of plant-specific and desired lighting inside a greenhouse.

According to a preferred embodiment of the system, the sensor is configured to operate over a bandwidth ranging from 385 nm to 1000 nm. Prior art sensors typically cover a detection range of approximately 400 nm to 750 nm. Therefore, the system can advantageously extend the range in both directions of the spectrum, rendering the system more effective as compared with typical sensors used in greenhouses.

According to a preferred embodiment of the system, the wavelength ranges are spaced apart by 10 nm to 50 nm steps, preferably 15 nm to 40 nm steps, particularly preferably by 20 to 30 nm steps. The more wavelength ranges are detected by the sensor the more accurate the measurement of the ambient light conditions can be, the ambient light being the combination of natural light stemming from the sun and the light generated by the light source of the system. Furthermore, the closer the measured wavelength ranges are to each other the more precise the measurement of the ambient light can be. The distance between two adjacent wavelength ranges can be measured by referring to a variety of reference points. For instance, the distance can be the distance between each peak of the adjacent spectral distributions. Preferably, the distance between two adjacent spectral distributions amounts to nm. In addition, the FWHM (full width at half maximum) can also amount to 20 nm. The FWHM is the difference between two values of the wavelength, at which the dependent variable, particularly the light intensity, is equal to half of the maximum value of the dependent variable.

According to a particularly preferred embodiment of the system, the sensor is configured to detect intensities in eighteen wavelength ranges. Preferably, the spectral distributions are arranged in an overlapping manner. In other words, adjacent spectral distributions can have points of intersection when depicted on one single figure. Due to the large number of spectral distributions, the light intensity actually present in the greenhouse can be reproduced more realistically. The intensity of each color/wavelength/frequency can be measured in $\mu mol/m^2 s$ (micromole per second per square meter per second), from which a full DLI (Daily Light Integral) can be calculated in mols per day.

According to a preferred embodiment of the system, each wavelength range comprises an interval size of 10 nm, preferably less than 7 nm, particularly preferably less than 5 nm. It is conceivable that the interval size is the difference between the maximum wavelength value and the minimum wavelength value of the intensity or spectral distribution of the measured light. Particularly preferred is an embodiment wherein a high number of wavelength ranges, e.g. 18, is combined with a narrow spectral distribution of intensity. This way, it is advantageously possible to cover/measure a relevant wavelength range, preferably from 385 nm to 1000 nm, by a multitude of wavelength ranges or spectral distributions as opposed to one single spectral distribution with a dominant wavelength and/or multiple peaks in the spectral distribution.

A preferred embodiment of the system comprises two sensors, a first sensor being arranged at a first altitude below the light source, a second sensor being arranged at a second altitude above the light source. Two sensors arranged at different altitudes in a greenhouse, particularly below and above the light source, enable operators of the greenhouse to distinguish the natural light coming in from the sun from the combination of the sunlight and the light generated by the light source, preferably an LED. Subsequently, based on the given light composition and the wavelengths of the sun, the control unit can induce an adjustment of the light source such that optimal wavelengths for plant growth can be dynamically set.

According to a preferred embodiment of the system, the control unit is configured to compare the measured intensities in the wavelength ranges with prestored values. The system can comprise a data storage medium, for instance a flash memory, wherein required data can be prestored and—if need be—retrieved for data comparison. It is preferred to compare particularly the intensities that are measured by the sensor with values of the prestored data. The comparison can be carried out in order to perform adjustments of the light source dynamically. Therefore, real-time processing is a preferred inherent feature of the system.

According to a preferred embodiment of the system, a growth-promoting second spectrum is prestored for each plant. The data and their values prestored in a system memory can refer to the plants cultivated within the greenhouse. In other words, for each plant to be grown in the greenhouse, a second spectrum of intensities can be prestored in the system memory. The prestored second spectrum of each plant aims at optimizing growth of the plant in question. An optimized growth can mean faster growth of the plants. Furthermore, it can particularly mean that the second spectrum of each plant comprises wavelengths that are specifically conducive and required for healthy plant growth.

According to another preferred embodiment of the system, the control unit is configured to normalize the measured intensities. Preferably, the intensities measured by the sensor are normalized to values between 0 and 1 or 0% and 100%. It is conceivable to correlate the measured intensities to the highest intensity measured.

Another object of the invention is a method for operating a system for controlling a light source illuminating plants in a greenhouse, wherein the system comprises
    a sensor for detecting a first spectrum of ambient light, the sensor being configured to measure incident intensities in at least two wavelength ranges, and
    a control unit for adjusting a second spectrum of the light source in dependency of the measured intensities in the at least two wavelength ranges, wherein in a measuring step the sensor detects incident intensities in at least two wavelength ranges, wherein in an adjustment step the second spectrum of the light source is adjusted in dependency of the measured intensities in the at least two wavelength ranges. All features, advantages and technical effects mentioned in connection with the above-mentioned system and the plurality of its embodiments apply also to the inventive method.

According to an embodiment of the invention, the sensor operates over a bandwidth ranging from 385 nm to 1000 nm. Prior art sensors typically cover a detection range of approximately 400 nm to 750 nm. Therefore, the method can advantageously extend the range in both directions of the spectrum, rendering the system more effective as compared with typical sensors used in greenhouses.

According to an embodiment of the invention, the sensor measures intensities in wavelength ranges that are spaced apart by 10 nm to 50 nm steps, preferably 15 nm to nm steps, particularly preferably by 20 to 30 nm steps. The more wavelength ranges are detected by the sensor the more accurate the measurement of the ambient light conditions can be, the ambient light being the combination of natural light stemming from the sun and the light generated by the light source of the system. Furthermore, the closer the measured wavelength ranges are to each other the more precise the measurement of the ambient light can be. The distance between two adjacent wavelength ranges can be measured by referring to a variety of reference points. For instance, the distance can be the distance between each peak of the adjacent spectral distributions. Preferably, the distance between two adjacent spectral distributions amounts to 20 nm. In addition, the FWHM (full width at half maximum) can also amount to 20 nm. The FWHM is the difference between two values of the wavelength, at which the dependent variable, particularly the light intensity, is equal to half of the maximum value of the dependent variable.

According to an embodiment of the invention, the sensor detects intensities in eighteen wavelength ranges. Preferably, the spectral distributions are arranged in an overlapping manner. In other words, adjacent spectral distributions can have points of intersection when depicted on one single figure. Due to the large number of spectral distributions, the light intensity actually present in the greenhouse can be reproduced more realistically. The intensity of each color/wavelength/frequency can be measured in $\mu mol/m^2 s$ (micromole per second per square meter per second) or $W/m^2$ (Watt/square meter), from which a full DLI (Daily Light Integral; sum of the entire day) can be calculated in mols per $m^2$ per day.

According to another embodiment of the invention, in a comparison step, that follows the measuring step and precedes the adjustment step, the control unit compares the measured intensities in the wavelength ranges with prestored values. The system can comprise a data storage medium, for instance a flash memory, wherein required data can be prestored and—if need be—retrieved for data comparison. It is preferred to compare particularly the intensities that are measured by the sensor with values of the prestored data. The comparison can be carried out in order to perform adjustments of the light source dynamically. Therefore, real-time processing is a preferred inherent feature of the system.

According to a particularly preferred embodiment of the invention, the control unit compares the measured intensities with plant-specific prestored values. Data and their values prestored in a system memory can refer to the plants cultivated within the greenhouse. In other words, for each plant to be grown in the greenhouse, a second spectrum of intensities can be prestored in the system memory. The prestored second spectrum of each plant aims at optimizing growth of the plant in question. An optimized growth can mean faster growth of the plants. Furthermore, it can particularly mean that the second spectrum of each plant comprises wavelengths that are specifically conducive and required for healthy plant growth.

According to another preferred embodiment of the invention, in a comparison step, that follows the measuring step and precedes the adjustment step, the control unit normalizes the measured intensities. Preferably, the intensities measured by the sensor are normalized to values between 0 and 1 or 0% and 100%. It is conceivable to correlate the measured intensities to the highest intensity measured.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

Figure 1:
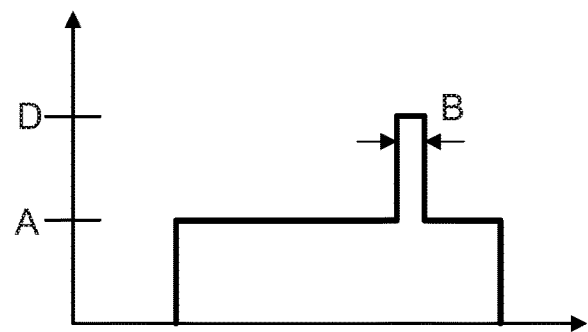
FIG. 1 illustrates schematically a simplified spectrum of light with a dominant wavelength

The present invention will be described with respect to particular embodiments and with reference to certain drawings but the invention is not limited thereto but only by the claims. The drawings described are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an exemplary spectrum of light with a dominant wavelength is illustrated. The abscissa (x-axis) represents wavelengths, whereas the ordinate (y-axis) represents intensities of the light. As can be seen in FIG. 1, the spectrum comprises a variety of wavelengths, here between 400 nm and 700 nm. In other words, the light is composed of a plurality of colors or frequencies.

The spectrum in FIG. 1 comprises exemplarily a so-called dominant wavelength, at approximately 600 nm. The dominant wavelength determines the color that is perceived by the human eye. For instance, at approximately 600 nm, the spectrum as depicted in FIG. 1 would appear rather orange to the human eye. It is also conceivable that the dominant wavelength is 500 nm or 400 nm or the like. Furthermore, the integral of the schematic curve (the area below the curve $L=[D-A]*B+A*W$) determines the luminance. In other words, the greater the area L the lighter/brighter the spectrum in question appears to the human eye.

Different plants need different spectra or wavelength compositions for optimal growth. The drawback of natural light or sunlight is that the present spectrum of the natural light inside the greenhouse 7 might be ideal for some plants that horticulturists cultivate but not for other plants. In order to optimally grow a multitude of plants within one and the same greenhouse 7, it is required to provide technical means, particularly an adjustable light source 3, so as to dynamically control the spectrum or the composition of wavelengths inside the greenhouse 7.

In order to set a light source 3 such that optimal plant-specific growth is ensured, the lighting conditions, particularly the wavelengths present in the greenhouse 7, must be measured. The measurement can be done by one or many sensors 9. Normalized sensitivities of eighteen sensors 9 will be shown in FIG. 2 and described hereafter.

Figure 2:
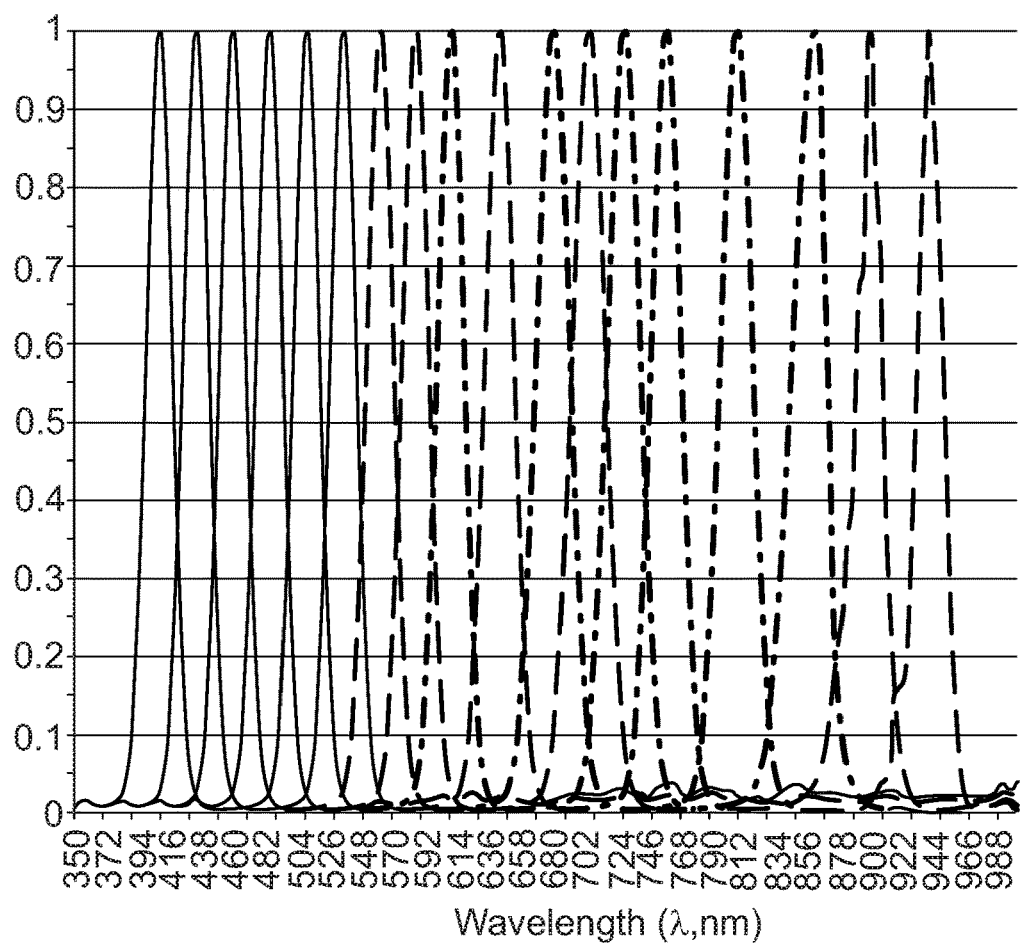
FIG. 2 illustrates a plurality of normalized responsivity spectra of sensors of an inventive system

In FIG. 2, the x-axis represents wavelengths, while the y-axis represents the relative sensitivity or responsivity of each of the eighteen sensors 9. The values of the wavelengths are between roughly 385 nm and 1000 nm. The values of the sensitivities of each sensor 9 are normalized with the peak sensitivity of the wavelength band of the sensor 9 in question. Therefore, the y-axis comprises values between 0 and 1 or, equivalently, 0% and 100%. The sensors 9 shown in FIG. 2 each comprise a Gaussian filter. In other words, a material is deposited onto the sensors 9 which results in the sensor 9 being sensitive only for a specific wavelength range. All sensors 9 are most sensitive to colors/wavelengths where the peak in their spectral plot is and less sensitive at greater and smaller wavelengths. This results in, at least approximately, the typical Gaussian bell curve for each sensor 9, as can be seen in FIG. 2.

By providing eighteen sensors 9 for detecting all wavelengths within the range of 385 nm to 1000 nm, a powerful means of measuring all relevant wavelengths for cultivating a variety of plants can be ensured. For instance, the sensitivity of the sensor 9 whose spectral plot is depicted on the far left in FIG. 2 is most sensitive to approximately 410 nm. At 410 nm, the normalized sensitivity of this very sensor 9 is the highest. Equivalently, the sensitivity of the sensor 9 whose spectral plot is depicted on the far right in FIG. 2 is most sensitive to approximately 940 nm. However, both mentioned sensors 9 are sensitive to colors within a specific wavelength range. For example, the plot on the far left shows that the sensor 9 in question is sensitive for wavelengths of nearly 385 nm up to 450 nm. None of the sensors 9 comprises a dominant wavelength. Based on such a sensor arrangement the lighting conditions within the greenhouse 7 can be determined efficiently. Subsequently for a specific plant currently being grown in the greenhouse 7, adjustments of a light source 3 can be made, particularly in case necessary wavelengths are missing. In other words, the light source 3 can complement the natural light in the greenhouse 7 that is subject to a multitude of variables such as weather or daytime.

It is also conceivable to use sensors 9 whose spectral plots are arranged such that their peaks comprise a displacement of 20 nm. The entirety of the eighteen sensors 9 can also be seen as eighteen channels of one single sensor 9. In such a case, the sensor 9 would be a so-called multispectral sensor 9.

Figure 3:
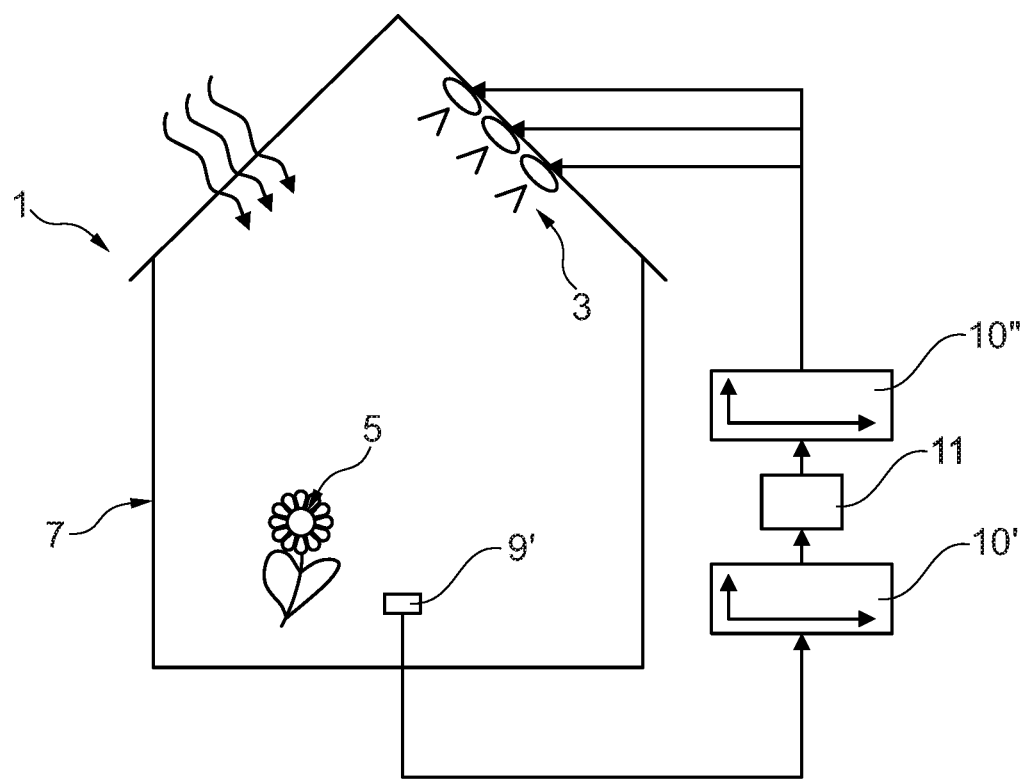
FIG. 3 illustrates schematically a greenhouse comprising the inventive system

In FIG. 3, a system 1 is illustrated schematically. The greenhouse 7 is symbolized by the outlines of a simplified house. Inside the greenhouse 7, the system 1 for controlling a light source 3 is arranged. The light source 3 is arranged at the ceiling of the greenhouse 7 and comprises eighteen LEDs from which three are exemplarily shown. The system 1 further comprises eighteen first sensors 9' that are arranged below the light source 3. However, for the sake of simplicity and for illustration purposes, only one of the eighteen first sensors 9' is shown. Furthermore, the system 1 comprises plants 5 of at least one specific sort.

A first spectrum 10' of the ambient light can be detected by the sensors 9'. The ambient light can be a blend of natural light stemming from the sun, in FIG. 3 indicated by curved arrows, and from the artificial light generated by the light source 3. The first sensor 9' measures incident light in at least two wavelength ranges and generates the first spectrum 10'. Information about the detected colors/wavelengths, in other words about the first spectrum 10', will be routed to a control unit 11.

It is conceivable that there is a second sensor 9" that is arranged at an altitude above the light source 3. The second sensor 9" can measure incident light in at least two wavelength ranges and generate a further first spectrum 10'. Information about the detected colors/wavelengths, in other words about the first spectrum 10' and the further first spectrum can be routed to the control unit 11.

By comparing the first spectrum 10' and the further first spectrum 10', the control unit 11 can determine to what extent the ambient light is composed of natural light and to what extent of artificial light. In other words, it can be differentiated between so-called direct and indirect controlling. Measuring incident light by the first sensor 9' below the light source 3, for instance at the altitude of plants, and subtracting detected values by the second sensor 9" that is arranged above the light source 3, can render direct controlling possible since both, the total light detected by the first sensor 9' and the natural light detected by the second sensor 9", can be measured directly. Alternatively, natural light can be calculated indirectly, by measuring the overall light (natural light from the sun plus synthetic light from the light source 3) by means of the first sensor 9' and, so to speak, by subtracting light values emitted by the light source 3. For that purpose, values of the light source 3 can be retrieved by the control unit 11.

Subsequently, the control unit 11 provides the light source 3 with information for adjusting the light source 3. In other words, the control unit 11 adjusts a second spectrum 10" of the light source 3 in dependency of the measured intensities in the at least two wavelength ranges so as to induce optimal lighting conditions for the plants 5.

Figure 4:
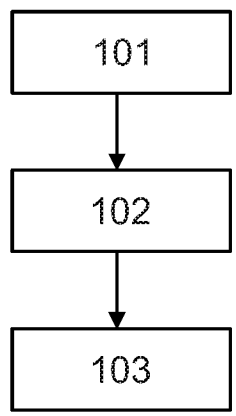
FIG. 4 illustrates an embodiment of the inventive method in a flow chart

In FIG. 4, a method according to an embodiment of the invention is illustrated. In a measuring step 101 the sensor 9 detects incident intensities in at least two wavelength ranges. In a subsequent comparison step 102, the control unit 11 compares the measured intensities in the wavelength ranges with prestored values. It is conceivable to store the prestored values in a flash memory. Prestored values can comprise different patterns. In other words, one specific pattern, put in simple words, could be a spectrum that comprises, e.g., 60% wavelengths of red color, 30% wavelengths of blue color and 10% wavelengths of green. It is also conceivable to implement multichannel dimming. In other words, the composition of the spectra can be changed continuously, increasing the percentage of one color in the composition on one hand and reducing that of another on the other hand. Thereafter, in an adjustment step 102, the second spectrum 10" of the light source 3 is adjusted in dependency of the measured intensities in the at least two wavelength ranges.

LIST OF REFERENCE SIGNS

1 System
3 Light source
5 Plant
7 Greenhouse
9 Sensor
9' First sensor
10' First spectrum
10" Second spectrum
11 Control unit

The invention claimed is:

1. A system for controlling a light source illuminating plants in a greenhouse, the system comprises:
   a sensor for detecting a first spectrum of ambient light, the sensor comprises eighteen channels or eighteen sensors for detecting eighteen first spectra of the ambient light, wherein one or the eighteen sensors are configured to measure incident intensities in eighteen wavelength ranges; and a control unit for adjusting a second spectrum of the light source in dependency of the measured incident intensities in the eighteen wavelength ranges, wherein spectral distributions of the eighteen intensities are arranged in an overlapping manner, wherein the control unit is configured to normalize the measured incident intensities.

2. The system according to claim 1, wherein the sensor is configured to operate over a bandwidth ranging from 385 nm to 1000 nm.

3. The system according to claim 1, wherein the wavelength ranges are spaced apart by 10 nm to 50 nm steps, or 15 nm to 40 nm steps, or by 20 to 30 nm steps.

4. The system according to claim 1, wherein each of the eighteen wavelength ranges comprise an interval size of 10 nm, or less than 7 nm, or less than 5 nm.

5. The system according to claim 1, wherein the system comprises two sensors, wherein a first sensor of the two sensors being arranged at a first altitude below the light source, and a second sensor of the two sensors being arranged at a second altitude above the light source.

6. The system according to claim 1, wherein the control unit is configured to compare the measured incident intensities in the wavelength ranges with prestored values.

7. The system according to claim 6, wherein for each plant a growth-promoting second spectrum is prestored.

8. The system according to claim 1, wherein the control unit is configured to normalize the measured incident intensities to values between 0 and 1 or 0% and 100%.

9. A method for operating a system for controlling a light source illuminating plants in a greenhouse, wherein the system comprises, a sensor for detecting a first spectrum of ambient light, the sensor comprises eighteen channels or eighteen sensors for detecting eighteen first spectra of the ambient light, wherein one or the eighteen sensors being configured to measure incident intensities in eighteen wavelength ranges, and a control unit for adjusting a second spectrum of the light source in dependency of the measured incident intensities in the eighteen wavelength ranges, wherein in a measuring step, the sensor detects incident intensities in at least two wavelength ranges, and in an adjustment step, the second spectrum of the light source is adjusted in dependency of the measured incident intensities in the eighteen wavelength ranges, and wherein spectral distributions of the eighteen intensities are arranged in an overlapping manner, wherein the control unit is configured to normalize the measured incident intensities.

10. The method according to claim 9, wherein the sensor operates over a bandwidth ranging from 385 nm to 1000 nm.

11. The method according to claim 9, wherein the sensor measures intensities in wavelength ranges that are spaced apart by 10 nm to 50 nm steps, or 15 nm to 40 nm steps, or by 20 to 30 nm steps.

12. The method according to claim 9, wherein in a comparison step, that follows the measuring step and precedes the adjustment step, the control unit compares the measured incident intensities in the wavelength ranges with prestored values.

13. The method according to claim 12, wherein the control unit compares the measured incident intensities with plant-specific prestored values.

14. The method according to claim 9, wherein in a comparison step, that follows the measuring step and precedes the adjustment step, the control unit normalizes the measured incident intensities.

15. The method according to claim 9, wherein the control unit is configured to normalize the measured incident intensities to values between 0 and 1 or 0% and 100%.

* * * * *